(12) United States Patent
Kitajima et al.

(10) Patent No.: US 10,960,819 B2
(45) Date of Patent: Mar. 30, 2021

(54) VEHICLE-MOUNTED ACCESSORY DEVICE MOUNTED ON VEHICLE, VEHICLE-MOUNTED DISPLAY SYSTEM

(71) Applicant: PANASONIC INTELLECTUAL PROPERTY MANAGEMENT CO., LTD., Osaka (JP)

(72) Inventors: Norihito Kitajima, Kanagawa (JP); Takefumi Ishida, Kanagawa (JP); Tomoaki Yamamoto, Kanagawa (JP); Yuji Matsumoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/711,888

(22) Filed: Dec. 12, 2019

(65) Prior Publication Data

US 2020/0189465 A1    Jun. 18, 2020

(30) Foreign Application Priority Data

Dec. 13, 2018 (JP) .............................. JP2018-233785

(51) Int. Cl.
| | |
|---|---|
| *B60R 1/00* | (2006.01) |
| *H04N 7/18* | (2006.01) |
| *B60R 1/12* | (2006.01) |
| *B60R 1/04* | (2006.01) |
| *B60R 11/00* | (2006.01) |
| *B60R 11/02* | (2006.01) |

(52) U.S. Cl.
CPC ................. *B60R 1/00* (2013.01); *B60R 1/04* (2013.01); *B60R 1/12* (2013.01); *H04N 7/18* (2013.01); *B60R 11/0235* (2013.01); *B60R 2001/1215* (2013.01); *B60R 2011/0033* (2013.01); *B60R 2300/8066* (2013.01)

(58) Field of Classification Search
CPC .... B60R 1/00; G02B 7/00; G02B 5/00; G02B 25/00
See application file for complete search history.

(56) References Cited

U.S. PATENT DOCUMENTS

| | | | |
|---|---|---|---|
| 5,058,851 A * | 10/1991 | Lawlor ..................... | B60R 1/04 248/549 |
| 2005/0174622 A1* | 8/2005 | Lawlor ................... | B60R 1/088 359/265 |
| 2011/0299185 A1* | 12/2011 | Rawlings ............... | B62D 65/14 359/872 |

FOREIGN PATENT DOCUMENTS

WO         03/041999         5/2003

* cited by examiner

*Primary Examiner* — Maryam A Nasri
(74) *Attorney, Agent, or Firm* — Greenblum & Bernstein, P.L.C.

(57) ABSTRACT

A mount is slid with respect to a base to build an assembly, the base including an upper surface fixed to a vehicle, a lower surface facing a direction opposite to that of the upper surface, a first lateral surface located between the lower surface and the upper surface, and a second lateral surface located between the lower surface and the upper surface and located opposite to the first lateral surface. The mount includes a bottom surface facing the lower surface, a first lateral wall joined to the bottom surface and facing the first lateral surface, and a second lateral wall joined to the bottom surface and facing the second lateral surface. A thickness of the first lateral wall in a direction from the first lateral wall to the second lateral wall is smaller in a first lower portion than in a first upper portion.

16 Claims, 6 Drawing Sheets

VEHICLE-MOUNTED ACCESSORY DEVICE MOUNTED ON VEHICLE, VEHICLE-MOUNTED DISPLAY SYSTEM

BACKGROUND

1. Field

The present disclosure relates to a vehicle-mounted accessory device and a vehicle-mounted display system mounted on a vehicle.

2. Description of the Related Art

A vehicle cabin mirror for rear view monitoring is provided in a vehicle cabin. A vehicle cabin mirror is required not to injure the head of a passenger when, for example, the head of the passenger is hit by the vehicle cabin mirror in a collision accident of the vehicle etc. A method is known whereby, for example, the vehicle cabin mirror is dropped without leaving edged portions so as not to injure the head of a passenger. Studies have been made on a method of moderating an impact on the head of a passenger applied when the vehicle cabin mirror hits the head of a passenger, by rotating the vehicle cabin mirror around an axis between the base adhesively attached to the front windshield and the stay joined to the base. Meanwhile, the base adhesively attached to the front windshield is mounted on a base inner with an open top and an open back via a linear spring having a pair of linear parts and a curved part. The vehicle cabin mirror is coupled to the base inner. When a collision occurs, the linear parts of the linear spring make a sliding motion so that the linear spring, the base inner, and the vehicle cabin mirror are moved to the front. The movement causes the vertical wall of the base inner to be hit by the base and is broken, and the base inner continues to be moved to the front and is dropped (see, for example, patent literature 1).

[Patent literature 1] WO03/041999

According to the related art, the linear spring is provided between the base and the base inner. Meanwhile, a simple structure with a small number of components is preferred for the purpose of inhibiting an increase in the manufacturing cost. Also, a display device may be mounted in place of the vehicle cabin mirror, and the vehicle cabin mirror and the display device are inclusively referred to as accessories. There is a need to remove an impacted accessory irrespective of the type of accessory.

SUMMARY

The present disclosure addresses the above-described issue, and an illustrative purpose thereof is to provide a technology for removing an impacted accessory by means of a simple structure.

A vehicle-mounted accessory device according to an embodiment of the present disclosure includes: a mount that is slid with respect to a base to build an assembly, the base including an upper surface fixed to a vehicle, a lower surface facing a direction opposite to that of the upper surface, a first lateral surface located between the lower surface and the upper surface, and a second lateral surface located between the lower surface and the upper surface and located opposite to the first lateral surface; a stay that is joined to the mount; and an accessory that is supported by the stay. The mount includes a bottom surface facing the lower surface, a first lateral wall joined to the bottom surface and facing the first lateral surface, and a second lateral wall joined to the bottom surface and facing the second lateral surface, The mount surrounds the first lateral surface, the second lateral surface, and the lower surface when the mount is fitted to the base, and a thickness of the first lateral wall in a direction from the first lateral wall to the second lateral wall is smaller in a first lower portion than in a first upper portion, and the first lower portion is closer to the bottom surface than the first upper portion.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

The knowledge that provides the basis of an embodiment of the present disclosure will be discussed before discussing the embodiment in specific details. The embodiment relates to a vehicle-mounted display system in which a display device is used as an example of the accessory. In the vehicle-mounted display system, an imaging device is provided toward the back of the vehicle, a display device is provided in the vehicle toward the top of the front windshield, and the display device displays an image captured by the imaging device. The base inner according to the related art joined to the vehicle cabin mirror is identified as a mount. The mount is made of a resin, and the base is made of a metal to make sure that the vertical wall of the mount is easily broken. A display device, which exemplifies the accessory, is required not to sway easily even when the vehicle is shaken in the absence of an impact. To ensure that the display device does not sway easily, it is preferred that the mount be made of a material more rigid than resin (e.g., metal).

There is a need to remove an impacted display device even when the mount is configured to have a high rigidity. In other words, the mount is required to meet the requirements for difficulty to sway in the absence of an impact and for easiness to remove the accessory in the event that an impact is applied. Further, a simple structure with a small number of components is called for to inhibit an increase in the manufacturing cost. The terms "parallel" and "orthogonal" in the following description not only encompass completely parallel or orthogonal but also encompass slightly off-parallel and off-orthogonal within the margin of error. The term "substantially" means identical within certain limits.

Figure 1:
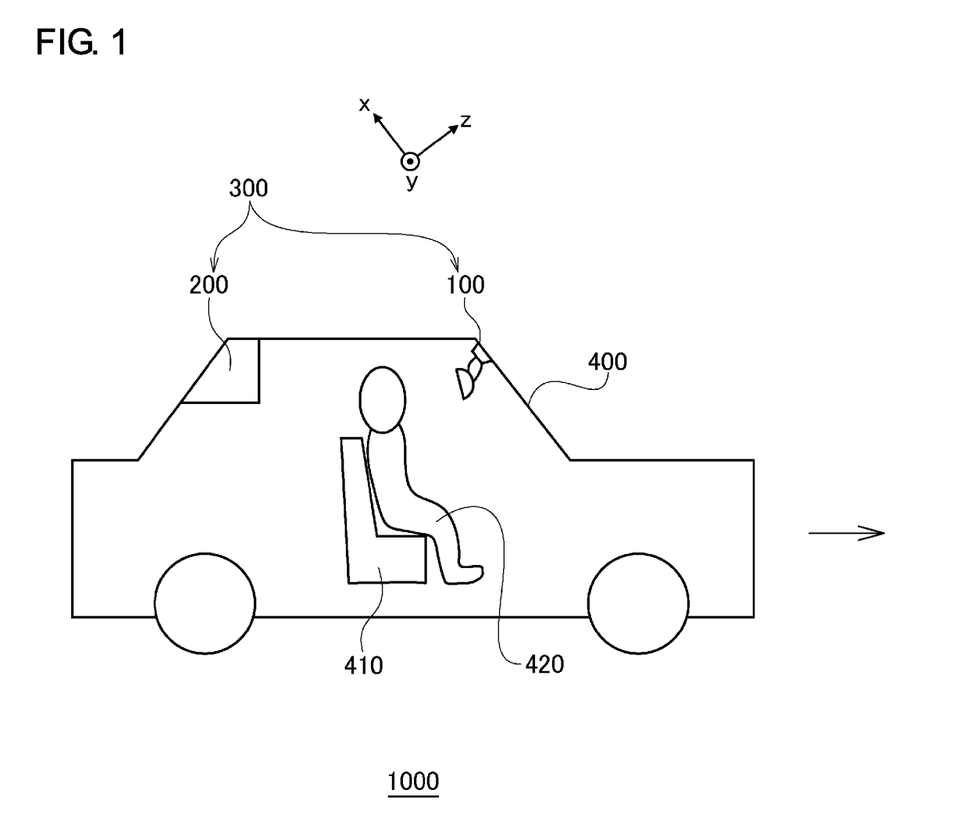
FIG. 1 shows a structure of a vehicle according to an embodiment.

FIG. 1 shows a structure of a vehicle 1000. The right side of FIG. 1 corresponds to the front side of the vehicle 1000. The vehicle 1000 includes a vehicle-mounted accessory device 100, an imaging device 200, a front windshield 400, a seat 410, and a passenger 420. As shown in FIG. 1, an orthogonal coordinate system formed by an x axis, y axis, and a z axis is defined. The x axis extends along the front windshield 400 and so has the same angle of inclination as the angle of inclination of the front windshield 400. The y axis is orthogonal to the x axis and extends in the transversal direction of the vehicle 1000. Therefore, the x-y plane matches the plane of the front windshield 400. The z axis is perpendicular to the x axis and the y axis and extends in the direction of the normal to the front windshield 400. The positive directions of the x axis, y axis, and z axis are defined in the directions of arrows in FIG. 1, and the negative directions are defined in the directions opposite to those of the arrows.

The positive direction of the x axis is an ascending direction extending backward along the front windshield 400 relative to the vehicle 1000, and the negative direction of the x axis is a descending direction extending forward along the front windshield 400 relative to the vehicle 1000. Further, the positive direction of the z axis is a direction of the normal extending forward from the front windshield 400 relative to the vehicle 1000, and the negative direction of the z axis is a direction of the normal extending backward from the front windshield 400 relative to the vehicle 1000. Hereinafter, the positive direction of the x axis may be referred to as "rear", "rearward", the negative direction of the x axis may be referred to as "front", "frontward", the positive direction of the y axis may be referred to as "left", "leftward", the negative direction of the y axis may be referred to as "right", "rightward", the positive direction of the z axis may be referred to as "upward", "upper", and the negative direction of z axis may be referred to as "downward" or "lower". "Rear" and "front" defined along the x axis differ from "rear" and "front" defined relative to the vehicle 1000, and "upward" and "downward" defined along the z axis differ from "upward" and "downward" defined relative to the vehicle 1000, but the respective pairs may be used without making a clear distinction.

A vehicle-mounted display system 300 includes the vehicle-mounted accessory device 100 and the imaging device 200. The imaging device 200 is provided in a rear portion of the vehicle 1000 and images a scene behind the vehicle 1000. The imaging device 200 may be directly connected to the vehicle-mounted accessory device 100 or connected to the vehicle-mounted accessory device 100 via an Electronic Control Unit (ECU) (not shown). For such connection, wireless communication, wired communication, or a combination thereof is used. The imaging device 200 outputs the captured image to the vehicle-mounted accessory device 100.

The vehicle-mounted accessory device 100 is provided on the front windshield 400 in the vehicle 1000, and, in particular, in the central portion of the front windshield 400 in the transversal direction. The seat 410 is provided at a rearward position in the vehicle 1000 relative to the vehicle-mounted accessory device 100, and the passenger 420 is seated in the seat 410. In the case the seat 410 is a driver's seat, the passenger 420 represents the driver. The vehicle-mounted accessory device 100 receives an image from the imaging device 200 and displays the image for the passenger 420 of the vehicle 1000. Therefore, the vehicle-mounted accessory device 100 is the aforementioned display device and displays the image inside the vehicle 1000.

Figure 2:
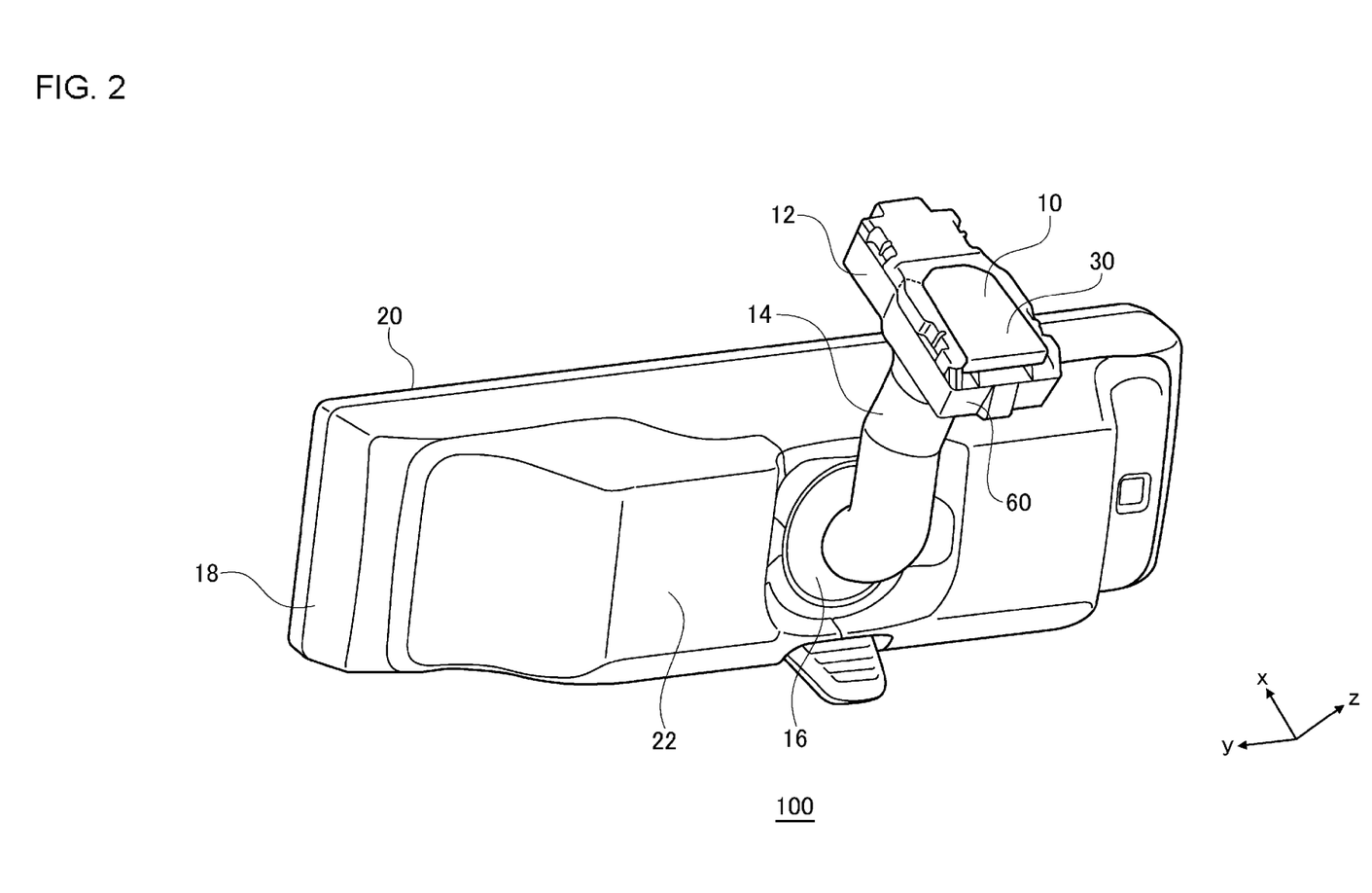
FIG. 2 is a perspective view showing a structure of the vehicle-mounted accessory device of FIG. 1.
Figure 3:
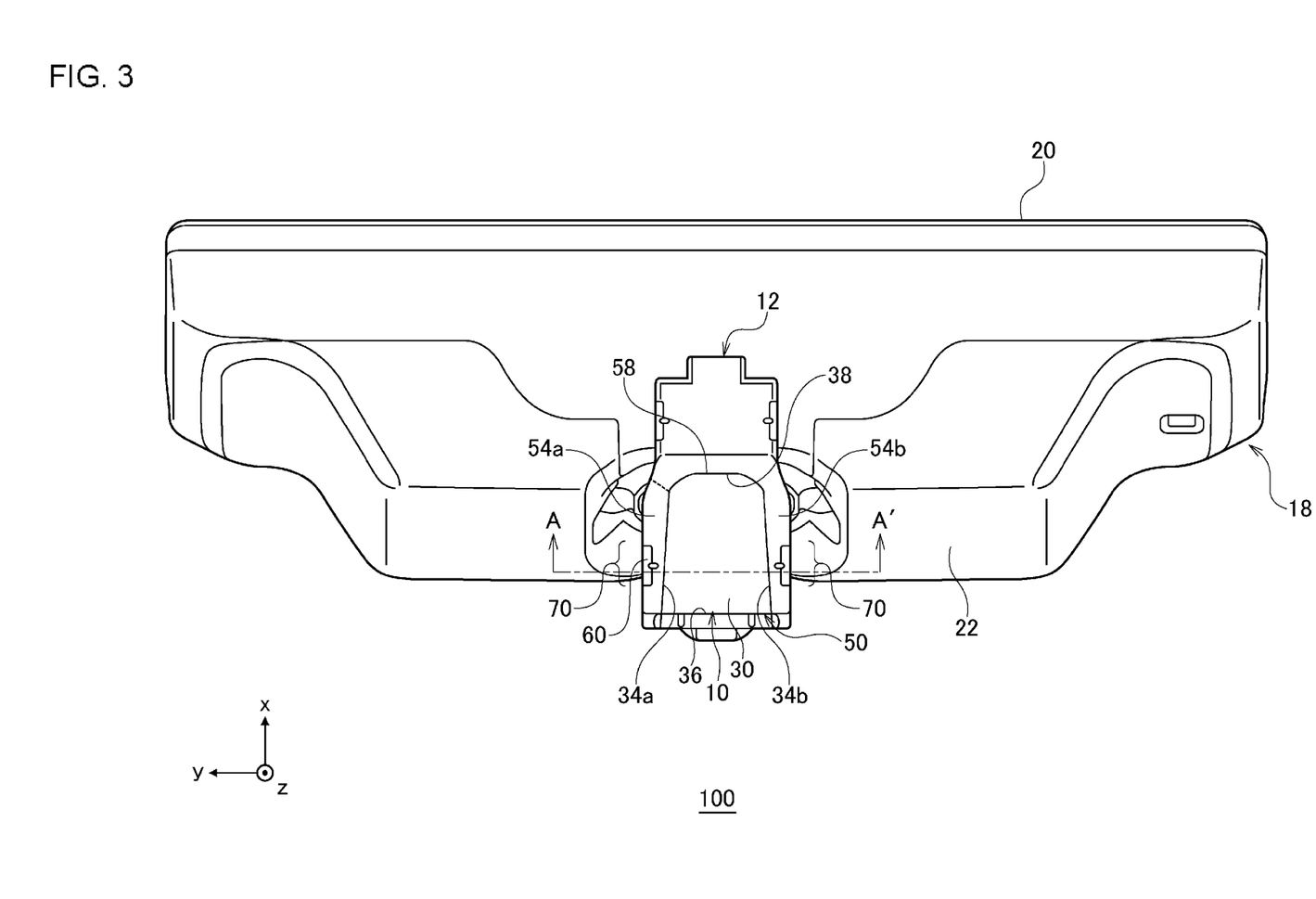
FIG. 3 is a top view showing a structure of the vehicle accessory device of FIG. 1.
Figure 4:
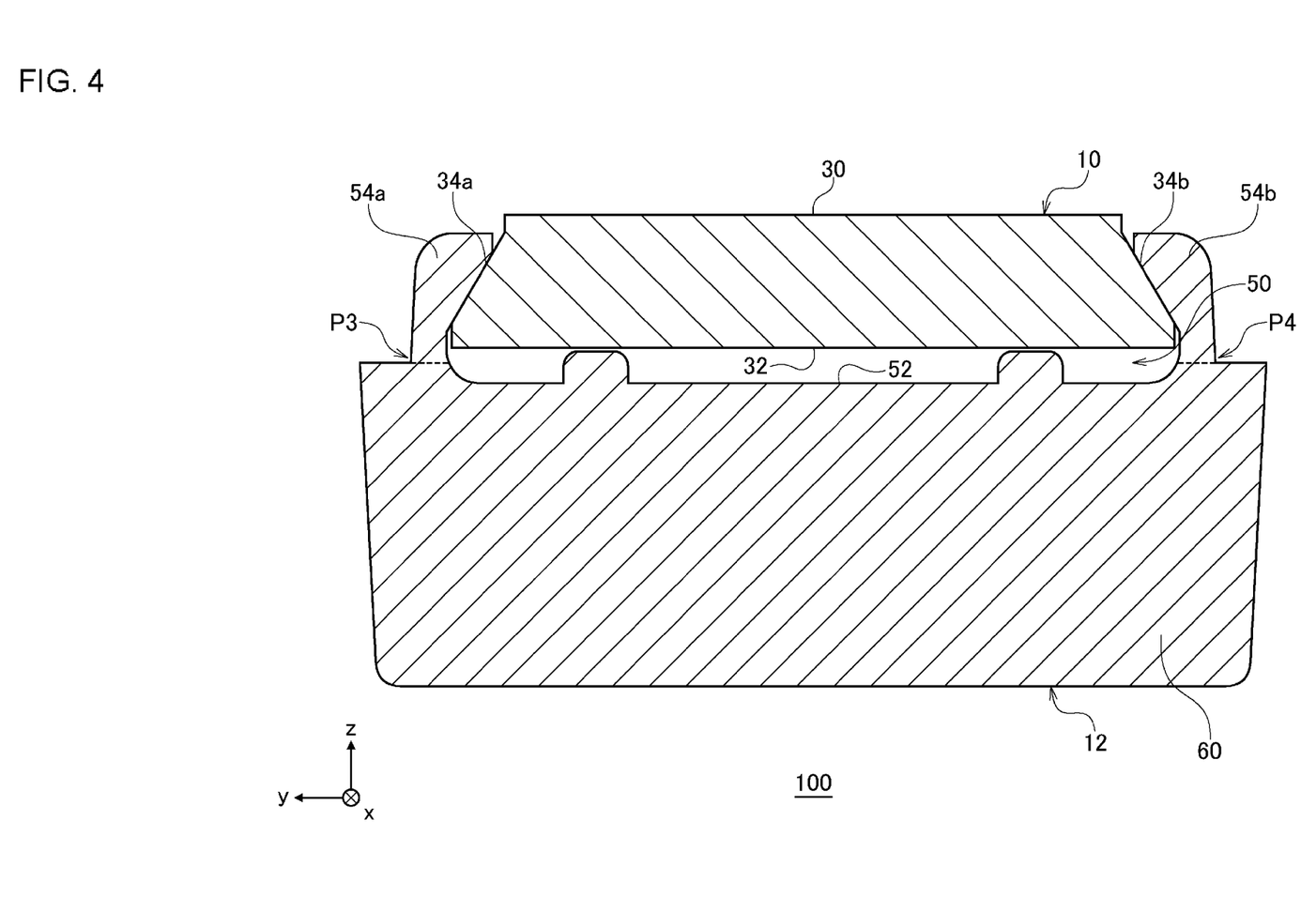
FIG. 4 is a cross-sectional view showing a structure of the vehicle accessory device of FIG. 1.

FIG. 2 is a perspective view showing a structure of the vehicle-mounted accessory device 100, FIG. 3 is a top view showing a structure of the vehicle-mounted accessory device 100, and FIG. 4 is an A-A' cross-sectional view of FIG. 3 showing a structure of the vehicle-mounted accessory device 100. The vehicle-mounted accessory device 100 includes a base 10, a mount 12, a stay 14, a joint plate 16, and a display device 18.

The base 10 includes an upper surface 30, a lower surface 32, and a first lateral surface 34a and a second lateral surface 34b, which are generically referred to as lateral surfaces 34, a front surface 36, and a rear surface 38. The base 10 has a plate shape and is made of a hard material such as metal. The upper surface 30 is a surface of the base 10 facing upward and is fixed to the front windshield 400 by using, for example, an adhesive, etc. The anchorage strength is defined such that the base 10 does not drop from the front windshield 400 in the case the mount 12, the stay 14, the joint plate 16, and the display device 18, which will be described later, receive an external impact force when the vehicle 1000 is halted abruptly or collides with something. The upper surface 30 is configured to be longer in the longitudinal direction than in the transversal direction.

The lower surface 32 is a surface of the base 10 facing downward, i.e., a surface facing a direction opposite to that of the upper surface 30. The lower surface 32 is also configured to be longer in the longitudinal direction than in the transversal direction. The first lateral surface 34a is a surface of the base 10 located between the lower surface 32 and the upper surface 30 and located leftward. The first lateral surface 34a has a rectangular shape elongated in the longitudinal direction and is inclined such that the closer to the lower surface 32, the further leftward the first lateral surface 34a is located. The second lateral surface 34b is a surface of the base 10 located between the lower surface 32 and the upper surface 30 and located rightward. That a surface is located rightward means, for example, that the surface is located opposite to the first lateral surface 34a. Therefore, the second lateral surface 34b is located opposite to the first lateral surface 34a in the base 10. The second lateral surface 34b has a rectangular shape elongated in the longitudinal direction and is inclined such that the closer to the lower surface 32, the further rightward the second lateral surface 34b is located.

Thus, since the first lateral surface 34a and the second lateral surface 34b are inclined such that the closer to the lower surface 32, the farther spaced apart the surfaces are from each other. Therefore, the length of the lower surface 32 in the transversal direction is longer than the length of the upper surface 30 in the transversal direction. Thus, the first lateral surface 34a and the second lateral surface 34b are inclined as if to spread out from the upper surface 30 toward the lower surface 32. That the first lateral surface 34a is inclined as if to spread out from the upper surface 30 toward the lower surface 32 means, for example, that the first lateral surface 34a is inclined to be distanced from the second lateral surface 34b in a direction from the upper surface 30 toward the lower surface 32. That the second lateral surface 34b is inclined as if to spread out from the upper surface 30 toward the lower surface 32 means, for example, that the second lateral surface 34b is inclined to be distanced from the first lateral surface 34a in a direction from the upper surface 30 toward the lower surface 32. The angle formed by the first lateral surface 34a and the upper surface 30 and the angle formed by the second lateral surface 34b and the upper surface 30 are identical.

The front surface 36 is a surface of the base 10 located between the lower surface 32 and the upper surface 30 and located frontward. The front surface 36 has a rectangular shape elongated in the transversal direction and extends substantially perpendicular with respect to the upper surface 30 and the lower surface 32. The rear surface 38 is a surface of the base 10 located between the lower surface 32 and the upper surface 30 and located rearward. The left and right sides of the rear surface 38 are curved to extend forward and are contiguous with the first lateral surface 34a and the second lateral surface 34b. The central portion of the rear surface 38 in the transversal direction extends linearly and is substantially parallel to the front surface 36.

The mount 12 includes a base housing 50, a bottom surface 52, a first lateral wall 54a and a second lateral wall 54b, which are generally referred to as lateral walls 54, a rear wall 58, and a mount main body 60. The mount main body 60 has a box shape elongated in the longitudinal direction and has a size larger than the base 10. The base housing 50 capable of housing the base 10 is formed in the mount main body 60. The base housing 50 has an open top and an open front. The base 10 is inserted and slid in a front-to-rear direction to build an assembly. That the base 10 is slid to build an assembly means, for example, that the base 10 can be mounted to the base housing 50 by sliding the base 10. The base housing 50 configured as described above is bounded by the bottom surface 52, the first lateral wall 54a, the second lateral wall 54b, and the rear wall 58. The bottom surface 52 is a surface oriented upward to face the lower surface 32 of the base 10 when the base 10 is slid into the base housing 50 to build the assembly. The bottom surface 52 has the same shape as the lower surface 32 in the x-y plane to enable the sliding base assembly. It should be noted that the bottom surface 52 may be larger than the lower surface 32 within the margin of error.

The first lateral wall 54a is provided on the left of the bottom surface 52 to rise upward from the bottom surface 52. Being provided to rise upward from the bottom surface 52 means, for example, being joined to the bottom surface 52 and facing the first lateral surface 34a. When the base 10 is slid into the base housing 50 to build the assembly, the first lateral wall 54a extends longitudinally to face the first lateral surface 34a. Meanwhile, the second lateral wall 54b is provided on the right of the bottom surface 52 to rise upward from the bottom surface 52. Being provided to rise upward from the bottom surface 52 means, for example, being joined to the bottom surface 52 and facing the second lateral surface 34b. When the base 10 is slid into the base housing 50 to build the assembly, the second lateral wall 54b extends longitudinally to face the second lateral surface 34b.

The right surface of the first lateral wall 54a configured as described above is inclined to conform to the inclination of the first lateral surface 34a such that the closer to the bottom surface 52, the further leftward the right surface is located. Being inclined to conform to the inclination of the first lateral surface 34a such that the closer to the bottom surface 52, the further leftward the location means, for example, being inclined to conform to the inclination of the first lateral surface 34a. Meanwhile the left surface of the first lateral wall 54a extends substantially perpendicularly with respect to the bottom surface 52 without being inclined. For this reason, the thickness of the first lateral wall 54a in the direction from the first lateral wall 54a toward the second lateral wall 54b, i.e., in the transversal direction, is smaller in a portion close to the bottom surface 52 (a first lower portion) than in a portion distanced from the bottom surface 52 (a first upper portion). Further, the left surface of the second lateral wall 54b is inclined to conform to the inclination of the second lateral surface 34b such that the closer to the bottom surface 52, the further rightward the left surface is located. Being inclined to conform to the inclination of the second lateral surface 34b such that the closer to the bottom surface 52, the further rightward the location means, for example, being inclined to conform to the inclination of the second lateral surface 34b. Meanwhile the right surface of the second lateral wall 54b extends substantially perpendicularly with respect to the bottom surface 52 without being inclined. For this reason, the thickness of the second lateral wall 54b in the transversal direction is smaller in a portion close to the bottom surface 52 (a second lower portion) than in a portion distanced from the bottom surface 52 (a second lower portion).

The rear wall 58 extends in the transversal direction. The left and right sides of the rear surface 38 are curved forward and are contiguous with the first lateral wall 54a and the second lateral wall 54b. The rear wall 58 has a shape that conforms to the rear surface 38 of the base 10. The rear wall 58 has a role of a stopper that stops the insertion of the base 10 by being in contact with the rear surface 38 of the base 10 inserted into the base housing 50 in the front-to-rear direction.

The transversal cross section of the base housing 50 bounded by the first lateral wall 54a, the bottom surface 52, and the second lateral wall 54b is inclined such that the cross section extends longer in the top-to-bottom direction. The transversal cross section of the base 10 is also inclined such that it extends longer in the top-to-bottom direction. By matching the angles of inclination of the base housing 50 and the base 10 configured as describe above, it is possible to slide the base 10, inserted in the front-to-back direction, to build the assembly. Because of the sliding base assembly, the downward and forward movement of the mount 12 are limited by the lateral surfaces 34 and the rear surface 38 of the base 10. As a result, the mount 12 is prevented from dropping from the base 10.

A thin-wall portion 70 is provided in the central portion of the first lateral wall 54a in the longitudinal direction. The transversal length of the first lateral wall 54a in the thin-wall portion 70 is smaller than the transversal length of the first lateral wall 54a in the portion other than the thin-wall portion 70. The relationship between the lengths in these two portions is maintained irrespective of the distance (e.g., the minimum distance) from the bottom surface 52. To describe it in specific details, the transversal length in the thin-wall portion 70 at a position distanced from the bottom surface 52, i.e., at a position where the transversal length of the first lateral wall 54a is relatively large, is smaller than the transversal length in the portion other than the thin-wall portion 70. Also, the transversal length in the thin-wall portion 70 at a position close to the bottom surface 52, i.e., at a position where the transversal length of the first lateral wall 54a is relatively small, is smaller than the transversal length in the portion other than the thin-wall portion 70. In this way, the thickness of the first lateral wall 54a in the transversal direction is, given the same distance from the bottom surface 52, smaller in the thin-wall portion 70 than elsewhere. In other words, the first lateral wall 54a has a first portion and a second portion that are equally distanced from the bottom surface 52. The thickness in the first portion in the direction from the first lateral wall 54a to the second lateral wall 54b is smaller than that of the second portion. The first portion is, for example, the thin-wall portion 70, and the second portion is, for example, the portion in the first lateral wall 54a other than the thin-wall portion 70. The second portion may be the entirety of the first lateral wall 54a excluding the thin-wall portion 70.

The thin-wall portion 70 is also provided in the central portion of the second lateral wall 54b in the longitudinal direction. The thin-wall portion 70 in the second lateral wall 54b is located at substantially the same position as the thin-wall portion 70 in the first lateral wall 54a in the longitudinal direction. Further, the structure of the thin-wall portion 70 in the second lateral wall 54b is substantially identical to the structure of the thin-wall portion 70 in the first lateral wall 54a. The thickness of the second lateral wall 54b in the transversal direction is, given the same distance from the bottom surface 52, smaller in the thin-wall portion 70 than elsewhere. In other words, the second lateral wall 54b has a third portion and a fourth portion that are equally distanced from the bottom surface 52. The thickness in the third portion in the direction from the first lateral wall 54a to the second lateral wall 54b is smaller than that of the fourth portion. The third portion is, for example, the thin-wall portion 70, and the fourth portion is, for example, the portion in the second lateral wall 54b other than the thin-wall portion 70. The fourth portion may be the entirety of the second lateral wall 54b excluding the thin-wall portion 70.

The mount 12 is formed as one piece. The mount 12 is manufactured by using a metal such as aluminum, magnesium, and zinc. Further, the mount 12 may be made of an alloy such as an aluminum alloy exemplified by ADC12. The mount 12 may be made of a glass with filler or a resin with a filler. In this case, the filler may be glass or carbon fiber. Thus, the mount 12 is a rigid body. A rigid body means an object that is not deformed when the mount 12 is assembled with the base 10 by sliding the base 10.

The stay 14 is joined to the lower part of the mount main body 60. The stay 14 extends downward and rearward from the mount 12, forming a curve, and is joined to a rear portion 22 of the display device 18. The joint plate 16 having a curved shape is provided in the portion in the rear portion 22 joined to the stay 14. A publicly known technology may be used for the joint between the mount main body 60 and the stay 14, the joint between the stay 14 and the rear portion 22, the structure of the stay 14, and the structure of the joint plate 16 so that a description thereof is omitted. For example, the stay 14 and the joint plate 16 are manufactured from a resin member. Alternatively, the stay 14 and the mount 12, or the stay 14 and the mount main body 60 may respectively be formed as one piece. In this case, the stay 14 is made of the same material as the mount 12 and so may be a rigid body like the mount 12.

The display device 18 has a box shape elongated in the transversal direction and is supported by the stay 14. The rear portion 22 joined to the stay 14 and a surface portion 20 opposite to the rear portion 22 are provided in the display device 18. The rear portion 22 is shaped such that the central portion in the transversal direction projects with respect to the end portions. The display device 18 exemplifies the accessory and displays an image captured by the imaging device 200 of FIG. 1 on a monitor (not shown) provided in the surface portion 20. For example, the monitor is a liquid crystal display or an organic electro-luminescence (EL) display. The display device 18 includes a function to receive an image, a function to play back an image, and a function to display an image. Therefore, the weight of the display device 18 is generally greater than the weight of the vehicle cabin mirror. A publicly known technology may be used for these functions so that a description thereof is omitted.

Figures 5A, 5B, 5C:
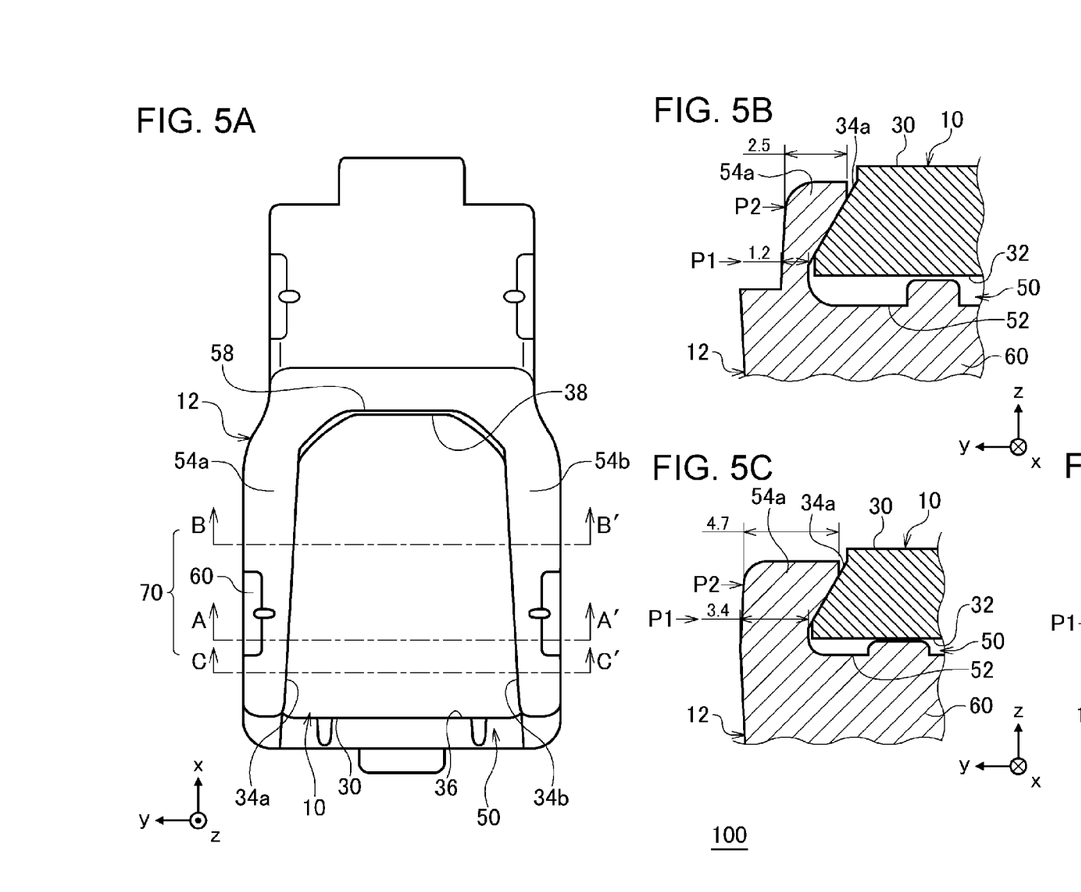
FIGS. 5A, 5B, 5C, and 5D show sizes in the structure of the vehicle-mounted accessory device of FIG. 1.

The thickness of the lateral walls 54 in the transversal direction will be described below in further details by using FIGS. 5A-5C. The first lateral wall 54a will be described as exemplifying the lateral walls 54, but the second lateral wall 54b has the same structure except that the structure thereof mirrors that of the first lateral wall 54a. FIGS. 5A-5D show sizes in the structure of the vehicle-mounted accessory device 100. FIG. 5A is a top view showing a structure of the base 10 and the mount 12 and is an illustration similar to FIG. 3. FIG. 5B is an A-A' cross-sectional view of FIG. 5A. FIG. 5B is similar to FIG. 4B but shows the vicinity of the first lateral wall 54a. As illustrated, a position P1 and a position P2 are defined in the vertical direction of the first lateral wall 54a. The position P1 represents the aforementioned position close to the bottom surface 52, and the position P2 represents the aforementioned position distanced from the bottom surface 52. The definition of the position P1 and the position P2 as described above remains unchanged in FIGS. 5C-5D described later. The transversal thickness of the first lateral wall 54a in the thin-wall portion 70 is "1.2 mm" at the position P1 and "2.5 mm" at the position P2. Thus, the thickness at the position P1 is configured to be "½" the thickness at the position P2 or smaller.

Figure 5D:
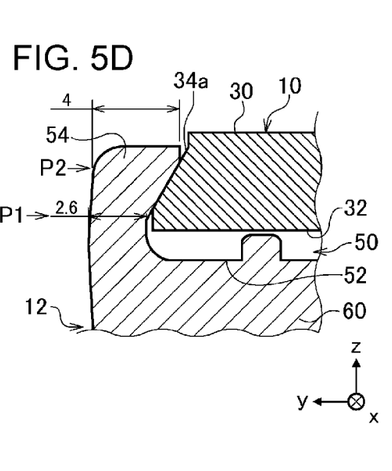

FIG. 5C is a B-B' cross-sectional view of FIG. 5A. The transversal thickness of the first lateral wall 54a in the portion other than the thin-wall portion 70 is "3.4 mm" at the position P1 and "4.7 mm" at the position P2. FIG. 5D is a C-C' cross-sectional view of FIG. 5A. The transversal thickness of the first lateral wall 54a in the portion other than the thin-wall portion 70 is "2.6 mm" at the position P1 and "4.0 mm" at the position P2. Thus, the thickness at the position P1 is configured to be more than "½" the thickness at the position P2 in the portion other than the thin-wall portion 70.

As described above, the mount 12 is manufactured from a rigid body so that the display device 18 does not sway easily even when the vehicle 1000 is shaken in the absence of an impact. Meanwhile, the transversal thickness of the lateral walls 54 at the position P1 is smaller than the thickness at the position P2 so that the lateral walls 54 are easily broken in the neighborhood of the position P1 (e.g., a position P3 or a position P4 in FIG. 4) in the event that an impact is applied. The breaking of the lateral walls 54 makes it easier for the display device 18 to drop in the event that an impact is applied. Further, since the transversal thickness of the lateral walls 54 in the thin-wall portion 70 is configured to be smaller than elsewhere, it is further ensured that the lateral walls 54 are easily broken in the neighborhood of the position P in the event that an impact is applied. Further, since the base 10 is slid into the mount 12 to build the assembly without being mediated by a linear spring, etc., the number of components is reduced, and the system is realized with a simple structure.

Figure 6:
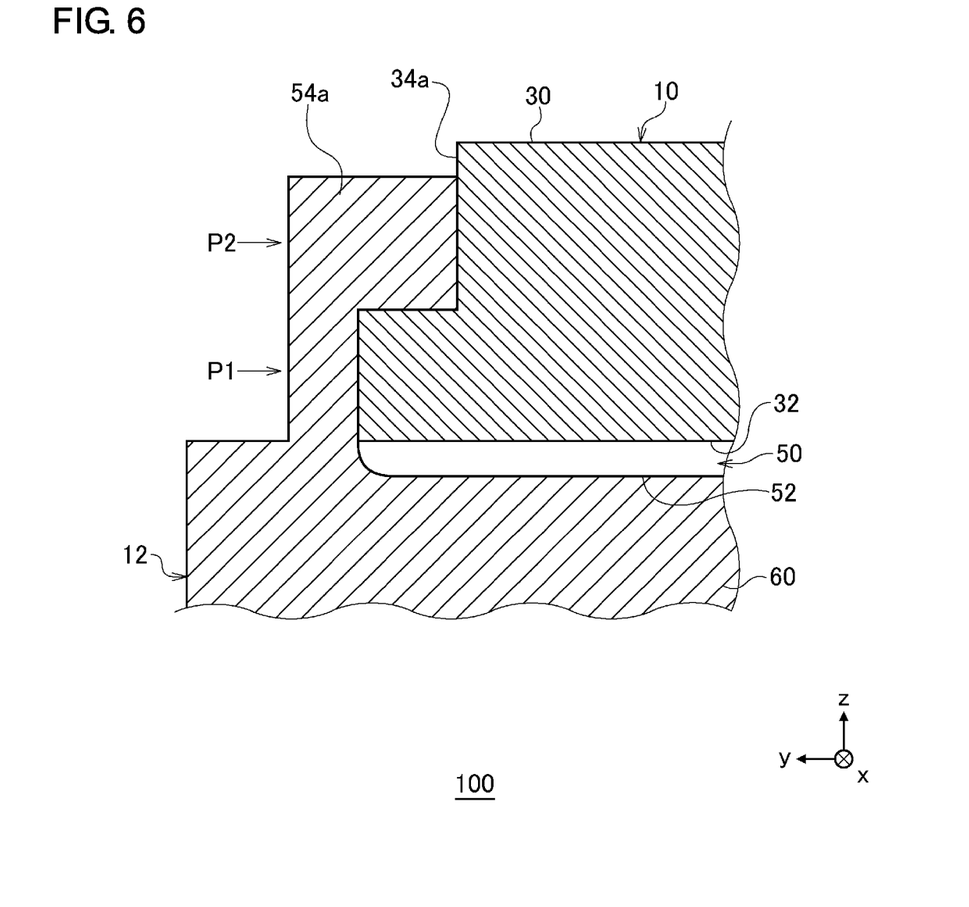
FIG. 6 is a partial cross-sectional view showing a structure of the vehicle-mounted accessory device 100 according to a variation.

The shape of the base 10 and the lateral walls 54 is not limited to the one described above. FIG. 6 is a partial cross-sectional view showing a structure of the vehicle-mounted accessory device 100 according to a variation. The figure shows the same portion as shown in FIG. 5B. The first lateral surface 34a described so far has a cross section inclined such that the closer to the lower surface 32, the further leftward the first lateral surface 34a is located. Meanwhile, the first lateral surface 34a according to the variation is shaped like a step such that the closer to the lower surface 32, the further leftward the first lateral surface 34a is located. FIG. 6 shows "2" steps, but the number of steps is not limited to this. The right surface of the first lateral wall 54a is shaped like a step to conform to the step shape of the first lateral surface 34a such that the closer to the bottom surface 52, the further leftward the right surface is. The number of steps in the step shape of the first lateral wall 54a is equal to the number of steps in the step shape of the first lateral surface 34a. Meanwhile, the left surface of the first lateral wall 54a is not inclined and extends substantially perpendicular to the bottom surface 52. For this reason, the thickness of the first lateral wall 54a in the transversal direction is smaller at the position P1 close to the bottom surface 52 than at the position P2 distanced from the bottom surface 52. Further, the second lateral surface 34b has a shape horizontally symmetrical to that of the first lateral surface 34a, and the second lateral wall 54b has a shape horizontally symmetrical to that of the first lateral wall 54a.

According to this variation, the mount is provided with the bottom surface, the first lateral wall, and the second lateral wall. The thickness of the first lateral wall in the transversal direction is smaller in a portion close to the bottom surface than in a portion distanced from the bottom surface. Accordingly, a simple structure ensures that the first lateral wall is broken in the event that an impact is applied. Further, since the first lateral wall is broken in the event that an impact is applied, the accessory can be removed in the event that an impact is applied. Further, since the first lateral wall is inclined to conform to the first lateral surface inclined as if to spread out from the upper surface toward the lower surface, the sliding base assembly is realized by means of a simple structure. Further, since the first lateral wall is inclined to conform to the first lateral surface inclined as if to spread out from the upper surface toward the lower surface, the mount can be fixed to the base.

Further, the thickness of the second lateral wall in the transversal direction is smaller in a portion close to the bottom surface than in a portion distanced from the bottom surface. Accordingly, a simple structure ensures that the second lateral wall is broken in the event that an impact is applied. Further, since the second lateral wall is broken in the event that an impact is applied, the accessory can be removed in the event that an impact is applied. Further, since the second lateral wall is also inclined to conform to the second lateral surface inclined as if to spread out from the upper surface toward the lower surface, the sliding base assembly is realized by means of a simple structure. Further, since the second lateral wall is inclined to conform to the second lateral surface inclined as if to spread out from the upper surface toward the lower surface, the mount can be fixed to the base.

Further, since the thickness of the first lateral wall is, given the same distance from the bottom surface, configured to be smaller in a portion than in the other portion, the accessory can be removed in the event that an impact is applied. Further, since the thickness of the second lateral wall is, given the same distance from the bottom surface, configured to be smaller in a portion than in the other portion, the accessory can be removed in the event that an impact is applied. Further, since the mount is manufactured from a rigid body, it is ensured that the accessory does not sway easily when the vehicle is shaken in the absence of an impact. Further, even in the case of using a display device as the accessory, a simple structure ensures that the accessory can be removed.

One embodiment of the present disclosure is summarized below. A vehicle-mounted accessory device according to an embodiment of the present disclosure includes: a mount that is slid into a base to build an assembly, the base including an upper surface fixed to a vehicle, a lower surface facing a direction opposite to that of the upper surface, a first lateral surface located between the lower surface and the upper surface, and a second lateral surface located between the lower surface and the upper surface and located opposite to the first lateral surface; a stay that is joined to the mount; and an accessory that is supported by the stay. The mount includes a bottom surface facing the lower surface, a first lateral wall joined to the bottom surface and facing the first lateral surface, and a second lateral wall joined to the bottom surface and facing the second lateral surface. The mount surrounds the first lateral surface, the second lateral surface, and the lower surface when the mount is fitted to the base, and a thickness of the first lateral wall in a direction from the first lateral wall to the second lateral wall is smaller in a first lower portion than in a first upper portion, and the first lower portion is closer to the bottom surface than the first upper portion.

According to this embodiment, the mount is provided with the bottom surface, the first lateral wall, and the second lateral wall, and the thickness of the first lateral wall in the transversal direction is smaller in the first lower portion than in the first upper portion. Accordingly, a simple structure ensures that the accessory can be removed in the event that an impact is applied.

The first lateral surface is inclined to be distanced from the second lateral surface in a direction from the upper surface toward the lower surface, and the first lateral wall is inclined to conform to an inclination of the first lateral surface. In this case, since the first lateral wall is inclined to conform to the first lateral surface inclined as if to spread out from the upper surface toward the lower surface, the sliding base assembly is realized by means of a simple structure.

A thickness of the second lateral wall in a direction from the first lateral wall to the second lateral wall is smaller in a second lower portion than in a second upper portion, and the second lower portion is closer to the bottom surface than the second upper portion. In this case, the thickness of the second lateral wall in the transversal direction is smaller in the second lower portion than in the second upper portion. Accordingly, a simple structure ensures that the accessory can be removed in the event that an impact is applied.

The second lateral surface is inclined to be distanced from the first lateral surface in a direction from the upper surface toward the lower surface, and the second lateral wall is inclined to conform to an inclination of the second lateral surface. In this case, since the second lateral wall is also inclined to conform to the second lateral surface inclined as if to spread out from the upper surface toward the lower surface, the sliding base assembly is realized by means of a simple structure.

The first lateral wall includes a first portion and a second portion equally distanced from the bottom surface, and the thickness of the first lateral wall in the direction from the first lateral wall to the second lateral wall is smaller in the first portion than in the second portion. In this case, since the thickness of the first lateral wall is, given the same distance from the bottom surface, configured to be smaller in a portion than in the other portion, the accessory can be removed in the event that an impact is applied.

The second lateral wall includes a third portion and a fourth portion equally distanced from the bottom surface, and a thickness of the second lateral wall in the direction from the first lateral wall to the second lateral wall is smaller in the third portion than in the fourth portion. In this case, since the thickness of the second lateral wall is, given the same distance from the bottom surface, configured to be smaller in a portion than in the other portion, the accessory can be removed in the event that an impact is applied.

The mount and the stay are formed as one piece. In this case, the number of components is reduced. Further, since the rigidity is improved by forming the mount and the stay as one piece, it is ensured that the accessory does not sway easily when the vehicle is shaken in the absence of an impact, and that the impact is easily transferred to the first lateral wall in the event that an impact is applied and breaks the first lateral wall. Further, since the first lateral wall is broken in the event that an impact is applied, the accessory can be removed in the event that an impact is applied.

The mount is a rigid body. In this case, since the mount is manufactured from a rigid body, it is ensured that the accessory does not sway easily when the vehicle is shaken in the absence of an impact.

A system may include: an imaging device that captures an image; and the vehicle-mounted accessory device. The accessory displays an image captured by the imaging device. In this case, a simple structure ensures that the accessory can be removed in the event that an impact is applied even when the display device is used as the accessory.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

In the embodiment, the display device 18 is used as the accessory. The embodiment is non-limiting as to the type of accessory, and a vehicle cabin mirror may be used as the accessory. According to this variation, the scope of application of the embodiment is expanded.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2018-233785, filed on Dec. 13, 2018, the entire contents of which are incorporated herein by reference.

What is claimed is:

1. A vehicle-mounted accessory device comprising:
a mount that is slid with respect to a base to build an assembly, the base including an upper surface fixed to a vehicle, a lower surface facing a direction opposite to that of the upper surface, a first lateral surface located between the lower surface and the upper surface, and a second lateral surface located between the lower surface and the upper surface and located opposite to the first lateral surface;
a stay that is joined to the mount; and
an accessory that is supported by the stay, wherein
the mount includes a bottom surface facing the lower surface, a first lateral wall joined to the bottom surface and facing the first lateral surface, and a second lateral wall joined to the bottom surface and facing the second lateral surface,
the mount surrounds the first lateral surface, the second lateral surface, and the lower surface when the mount is fitted to the base,
a thickness of the first lateral wall in a direction from the first lateral wall to the second lateral wall is smaller in a first lower portion than in a first upper portion, and
the first lower portion is closer to the bottom surface than the first upper portion.

2. The vehicle-mounted accessory device according to claim 1, wherein
the first lateral surface is inclined to be distanced from the second lateral surface in a direction from the upper surface toward the lower surface, and
the first lateral wall is inclined to conform to an inclination of the first lateral surface.

3. The vehicle-mounted accessory device according to claim 1, wherein
a thickness of the second lateral wall in a direction from the first lateral wall to the second lateral wall is smaller in a second lower portion than in a second upper portion, and
the second lower portion is closer to the bottom surface than the second upper portion.

4. The vehicle-mounted accessory device according to claim 2, wherein
a thickness of the second lateral wall in a direction from the first lateral wall to the second lateral wall is smaller in a second lower portion than in a second upper portion, and
the second lower portion is closer to the bottom surface than the second upper portion.

5. The vehicle-mounted accessory device according to claim 3, wherein
the second lateral surface is inclined to be distanced from the first lateral surface in a direction from the upper surface toward the lower surface, and
the second lateral wall is inclined to conform to an inclination of the second lateral surface.

6. The vehicle-mounted accessory device according to claim 4, wherein
the second lateral surface is inclined to be distanced from the first lateral surface in a direction from the upper surface toward the lower surface, and
the second lateral wall is inclined to conform to an inclination of the second lateral surface.

7. The vehicle-mounted accessory device according to claim 1, wherein
the first lateral wall includes a first portion and a second portion equally distanced from the bottom surface, and the thickness of the first lateral wall in the direction from the first lateral wall to the second lateral wall is smaller in the first portion than in the second portion.

8. The vehicle-mounted accessory device according to claim 2, wherein
the first lateral wall includes a first portion and a second portion equally distanced from the bottom surface, and the thickness of the first lateral wall in the direction from the first lateral wall to the second lateral wall is smaller in the first portion than in the second portion.

9. The vehicle-mounted accessory device according to claim 3, wherein
the first lateral wall includes a first portion and a second portion equally distanced from the bottom surface, and the thickness of the first lateral wall in the direction from the first lateral wall to the second lateral wall is smaller in the first portion than in the second portion.

10. The vehicle-mounted accessory device according to claim 4, wherein
the first lateral wall includes a first portion and a second portion equally distanced from the bottom surface, and the thickness of the first lateral wall in the direction from the first lateral wall to the second lateral wall is smaller in the first portion than in the second portion.

11. The vehicle-mounted accessory device according to claim 5, wherein the first lateral wall includes a first portion and a second portion equally distanced from the bottom surface, and the thickness of the first lateral wall in the direction from the first lateral wall to the second lateral wall is smaller in the first portion than in the second portion.

12. The vehicle-mounted accessory device according to claim 6, wherein
the first lateral wall includes a first portion and a second portion equally distanced from the bottom surface, and the thickness of the first lateral wall in the direction from the first lateral wall to the second lateral wall is smaller in the first portion than in the second portion.

13. The vehicle-mounted accessory device according to claim 1, wherein
the second lateral wall includes a third portion and a fourth portion equally distanced from the bottom surface, and a thickness of the second lateral wall in the direction from the first lateral wall to the second lateral wall is smaller in the third portion than in the fourth portion.

14. The vehicle-mounted accessory device according to claim 1, wherein
the mount and the stay are formed as one piece.

15. The vehicle-mounted accessory device according to claim 1, wherein
the mount is a rigid body.

16. A vehicle-mounted display system comprising:
an imaging device that captures an image; and
the vehicle-mounted accessory device according to claim 1, wherein
the accessory displays an image captured by the imaging device.

* * * * *